US012771417B2

(12) United States Patent
Chiu et al.

(10) Patent No.: US 12,771,417 B2
(45) Date of Patent: Oct. 20, 2026

(54) NEIGHBORING BEAM ASSISTED BEAMFORMING AND BEAMTRACKING

(71) Applicant: Apple Inc., Cupertino, CA (US)

(72) Inventors: Sung-En Chiu, San Diego, CA (US); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 18/917,664

(22) Filed: Oct. 16, 2024

(65) Prior Publication Data

US 2025/0038804 A1 Jan. 30, 2025

Related U.S. Application Data

(63) Continuation of application No. 18/101,959, filed on Jan. 26, 2023, now Pat. No. 12,143,181.

(60) Provisional application No. 63/408,009, filed on Sep. 19, 2022.

(51) Int. Cl.
*H04B 7/06* (2006.01)

(52) U.S. Cl.
CPC ......... *H04B 7/0617* (2013.01); *H04B 7/0619* (2013.01)

(58) Field of Classification Search
CPC ... H04B 7/0617; H04B 7/0619; H04B 7/0695
See application file for complete search history.

(56) References Cited

U.S. PATENT DOCUMENTS

| | | | | |
|---|---|---|---|---|
| 10,582,430 | B2 | 3/2020 | Park | |
| 2018/0184387 | A1 | 6/2018 | Axén et al. | |
| 2019/0273583 | A1 | 9/2019 | Ugurlu et al. | |
| 2019/0305830 | A1 | 10/2019 | Zhou et al. | |
| 2019/0313384 | A1 | 10/2019 | John Wilson et al. | |
| 2020/0145977 | A1 * | 5/2020 | Kumar | G01S 5/0063 |
| 2020/0235800 | A1 * | 7/2020 | Tang | H04B 7/0695 |

FOREIGN PATENT DOCUMENTS

| | | | |
|---|---|---|---|
| WO | 2017213895 | A1 | 12/2017 |
| WO | 2021032267 | A1 | 2/2021 |
| WO | 2021064238 | A1 | 4/2021 |
| WO | 2021219283 | A1 | 11/2021 |

* cited by examiner

*Primary Examiner* — Sung S Ahn
(74) *Attorney, Agent, or Firm* — FLETCHER YODER PC

(57) ABSTRACT

A base station may transmit beams to user equipment. The user equipment may receive the beams and transmit a signal to a base station. The base station may determine signal characteristics associated with the beams based on the signal and compare the signal characteristics with predefined signal characteristics that correspond to potential locations of the user equipment. Based on this comparison, the base station may determine a position of the user equipment and transmit a targeted beam based on the position of the user equipment. The base station may also track the position of the user equipment and provide an updated targeted beam based on an updated position of the user equipment. Accordingly, the base station may efficiently form and update the targeted beam based on the predefined signal characteristics, thereby reducing an amount of time required to establish and maintain communication with the user equipment.

20 Claims, 13 Drawing Sheets

150

| ANGLE | BEAM 1 | BEAM 2 | BEAM 3 | BEAM 4 | BEAM 5 |
|---|---|---|---|---|---|
| –15 | 0.14 | 3.48 | 2.52 | –1.00 | 0.01 |

FIG. 10

160

| ANGLE | BEAM 1 | BEAM 2 | BEAM 3 | BEAM 4 | BEAM 5 |
|---|---|---|---|---|---|
| –30 | 2.68 | 3.79 | 0.00 | –0.56 | 1.08 |
| –29 | 2.53 | 3.85 | 0.14 | –0.64 | 1.06 |
| –28 | 2.37 | 3.90 | 0.28 | –0.72 | 1.03 |
| –27 | 2.21 | 3.95 | 0.44 | –0.79 | 0.99 |
| –26 | 2.04 | 3.98 | 0.59 | –0.85 | 0.95 |
| –25 | 1.87 | 3.99 | 0.76 | –0.91 | 0.89 |
| –24 | 1.70 | 4.00 | 0.93 | –0.96 | 0.83 |
| –23 | 1.52 | 3.99 | 1.10 | –1.01 | 0.76 |
| –22 | 1.34 | 3.97 | 1.28 | –1.04 | 0.69 |
| –21 | 1.17 | 3.94 | 1.46 | –1.07 | 0.60 |
| –20 | 0.99 | 3.90 | 1.64 | –1.08 | 0.51 |
| –19 | 0.81 | 3.84 | 1.82 | –1.09 | 0.42 |
| –18 | 0.64 | 3.77 | 2.00 | –1.08 | 0.32 |
| –17 | 0.47 | 3.68 | 2.18 | –1.07 | 0.22 |
| –16 | 0.30 | 3.59 | 2.35 | –1.04 | 0.12 |
| –15 | 0.14 | 3.48 | 2.52 | –1.00 | 0.01 |
| –14 | –0.01 | 3.36 | 2.69 | –0.94 | –0.09 |
| –13 | –0.16 | 3.23 | 2.85 | –0.88 | –0.20 |
| –12 | –0.29 | 3.09 | 3.01 | –0.80 | –0.30 |
| –11 | –0.42 | 2.94 | 3.16 | –0.71 | –0.41 |
| –10 | –0.54 | 2.78 | 3.29 | –0.61 | –0.50 |
| –9 | –0.65 | 2.61 | 3.42 | –0.50 | –0.60 |
| –8 | –0.75 | 2.44 | 3.54 | –0.38 | –0.69 |
| –7 | –0.83 | 2.26 | 3.64 | –0.24 | –0.77 |
| –6 | –0.91 | 2.07 | 3.74 | –0.10 | –0.84 |
| –5 | –0.97 | 1.88 | 3.81 | 0.05 | –0.91 |

FIG. 11

NEIGHBORING BEAM ASSISTED BEAMFORMING AND BEAMTRACKING

CROSS-REFERENCE TO RELATED APPLICATIONS

This application is a continuation of U.S. application Ser. No. 18/101,959, filed Jan. 26, 2023, entitled "NEIGHBORING BEAM ASSISTED BEAMFORMING AND BEAMTRACKING," which claims priority to U.S. Provisional Application No. 63/408,009, filed Sep. 19, 2022, entitled "NEIGHBORING BEAM ASSISTED BEAMFORMING AND BEAMTRACKING," each of which is incorporated herein in its entirety for all purposes.

BACKGROUND

The present disclosure relates generally to wireless communication, and more specifically to forming a beam for wireless communication with user equipment.

In wireless communication, a base station may include antennas that emit beams to enable communication with user equipment. The user equipment may receive the beams and transmit a signal to the base station. The base station may include a large array of antennas that enable communication at higher frequencies relative to smaller arrays of antennas. However, as the number of antennas of the base station increases, the number of beams emitted by the antennas increases, which may increase the complexity of communication between the base station and the user equipment. Additionally, after establishing communication between the base station and the user equipment, the user equipment may move relative to the base station, which may further increase the complexity of communication between the base station and the user equipment.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device may include a plurality of antennas, a transmitter coupled to the plurality of antennas, a receiver coupled to the plurality of antennas, and processing circuitry coupled to the transmitter and the receiver. The transmitter may be configured to transmit a plurality of beams from the plurality of antennas. The receiver may be configured to receive an indication of user equipment. The processing circuitry may be configured to receive a signal characteristic of each beam of the plurality of beams based on the indication of the user equipment, receive a position of the user equipment based on the signal characteristic of each beam of the plurality of beams, and transmit, using the transmitter, a targeted beam based on the position of the user equipment.

In another embodiment, an electronic device may include a receiver configured to receive a plurality of beams from an additional electronic device and a plurality of predefined signal characteristics of each beam of the plurality of beams, a transmitter configured to transmit a signal, and processing circuitry coupled to the transmitter and the receiver. The processing circuitry may be configured to receive a signal characteristic of each beam of the plurality of beams, receive a position of the electronic device relative to the additional electronic device based on the signal characteristic of each beam of the plurality of beams and the plurality of predefined signal characteristics of each beam of the plurality of beams, and transmit, using the transmitter, an indication of the position of the electronic device relative to the additional electronic device.

In yet another embodiment, a method may include transmitting, using a transmitter of an electronic device, a plurality of beams from a plurality of antennas of the electronic device, receiving, using the receiver of the electronic device, an indication of user equipment, receiving a signal characteristic of each beam of the plurality of beams based on the indication of the user equipment, receiving a position of the user equipment based on the signal characteristic of each beam of the plurality of beams and a predefined table, and transmitting, using the transmitter, a targeted beam based on the position of the user equipment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 10 is a table of signal characteristics of the five beams of FIG. 7, according to embodiments of the present disclosure;

FIG. 11 is a table of predefined signal characteristics of the five beams of FIG. 7, according to embodiments of the present disclosure;

DETAILED DESCRIPTION OF SPECIFIC EMBODIMENTS

Figure 1:
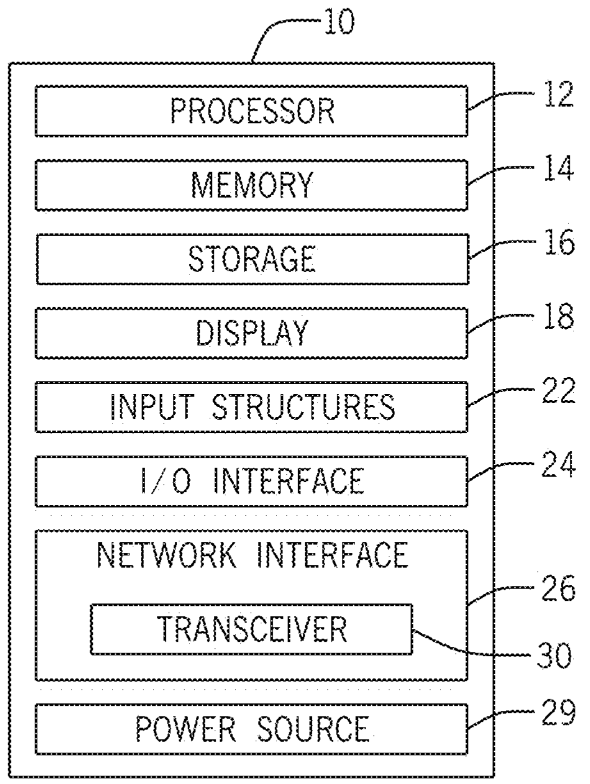
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately." "near." "about." "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to forming a beam for wireless communication with user equipment and tracking the beam based on movement of the user equipment. A base station (e.g., an electronic device) may include antennas that emit beams to enable communication with the user equipment. The user equipment may receive the beams and transmit a signal to the base station. The base station may include a large array of antennas that enable communication with the user equipment at higher frequencies relative to smaller arrays of antennas. However, as the number of antennas of the base station increases, the number of beams emitted by the antennas increases, which may increase the time required to form a refined beam directed toward the user equipment.

In some instances, beam-forming may be performed in phases. In a first phase, the base station may perform beam sweeping and transmit Synchronization Signal (SS) Blocks (SSBs) and/or Physical Broadcast Channel (PBCH) Blocks in beams from the antennas. In a second phase, the base station may refine the beams by transmitting reference signals (e.g., channel state information reference signals (CSI-RS)) with the beams. In a third phase, the base station transmits the refined beam over time, and the user equipment uses the refined beam in reception beam sweeping to find the best reception beam. However, these three phases may take an excessive amount of time and communication resources (e.g., SSBs, PBCH Blocks, CSI-RSs, and so on).

Additionally, after establishing communication between the base station and the user equipment, the user equipment may move relative to the base station, which may further increase the complexity of communication between the base station and the user equipment. For example, additional reference signal resources (e.g., CSI-RS) may be required during the second phase and the third phase for both transmission and reception beam-forming.

Embodiments herein provide various apparatuses and techniques to reduce the time required for a targeted (e.g., refined) beam acquisition and to facilitate tracking the targeted beam based on movement of the user equipment. To do so, the embodiments disclosed herein include a base station having antennas, a transmitter configured to transmit neighboring beams from the antennas, and a receiver configured to receive an indication of user equipment. The user equipment may receive the neighboring beams and transmit a signal to the base station (e.g., an indication of the user equipment). The base station may receive (e.g., determine) a signal characteristic associated with each beam of the neighboring beams based on the signal transmitted from the user equipment. For example, the signal characteristic may include a signal strength associated with each beam. The base station may compare the signal characteristic of each beam with predefined signal characteristics for each beam that correspond to potential locations of the user equipment. Based on this comparison, the base station may receive a position of the user equipment and transmit a targeted beam based on the position of the user equipment. The base station may efficiently form the targeted beam based on the predefined signal characteristics, thereby replacing the first phase, the second phase, and the third phase for beam-forming described above. Accordingly, the techniques described herein may reduce an amount of time and communication resources (e.g., SSBs, PBCH Blocks, CSI-RSs, and so on) used to establish communication with the user equipment relative to traditional embodiments.

Additionally, the base station may receive an additional indication of the user equipment, such as an additional or updated signal from the user equipment. The base station may receive an additional signal characteristic of each beam and determine whether the additional signal characteristic for each beam is different than the previous signal characteristic for each beam. The base station may receive an updated position of the user equipment based on the additional signal characteristic being different than the previous signal characteristic. For example, the signal strength associated with each beam may change based on the user equipment changing position and a signal received from the user equipment changing direction. The base station may transmit an updated targeted beam based on the updated position of the user equipment, thereby replacing the second phase and the third phase procedure that uses additional reference signal resources described above. Accordingly, the base station may efficiently track the position of the user equipment and update the targeted beam, thereby more efficiently maintaining communication with the user equipment in less time and with less resource usage relative to traditional embodiments.

FIG. 1 is a block diagram of user equipment 10, according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the user equipment 10.

By way of example, the user equipment 10 may include any suitable electronic device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable the user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
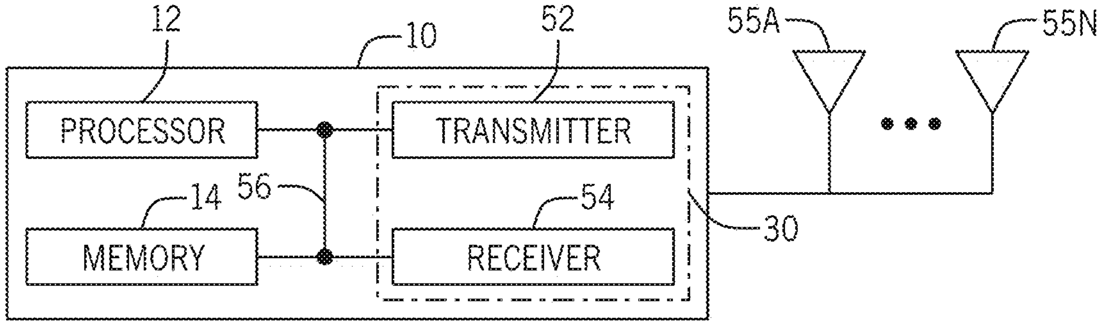
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The user equipment 10 may include the transmitter 52 and/or the receiver 54 that respectively enable transmission and reception of signals between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
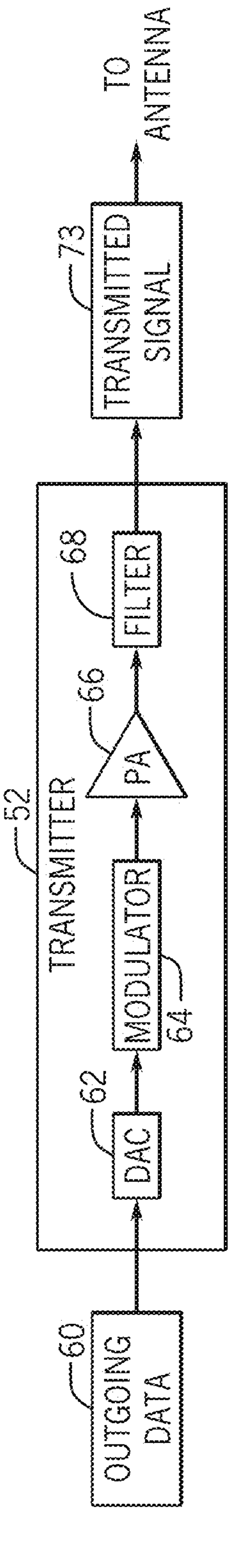
FIG. 3 is a schematic diagram of a transmitter of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE), and more specifically, a transmit front end (TXFE) of the user equipment 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
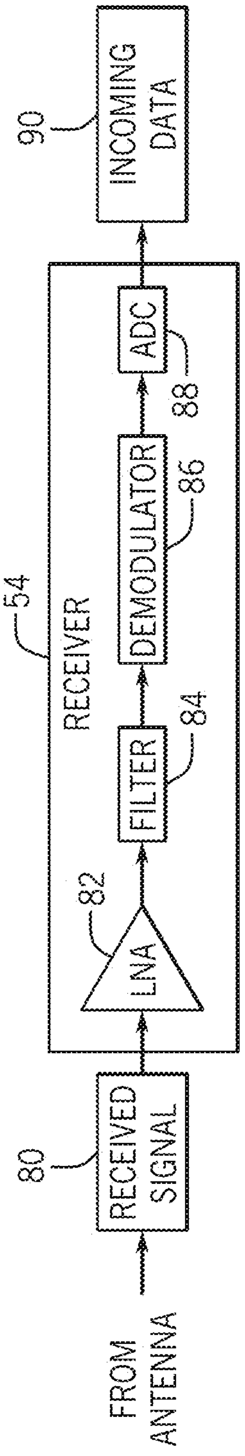
FIG. 4 is a schematic diagram of a receiver of the user equipment of FIG. 1, according to embodiments of the present disclosure.

FIG. 4 is a schematic diagram of the receiver 54 (e.g., receive circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. The low noise amplifier 82 and/or the filter 84 may be referred to as part of the RFFE, and more specifically, a receiver front end (RXFE) of the user equipment 10.

A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the user equipment 10. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter.

Figure 5:
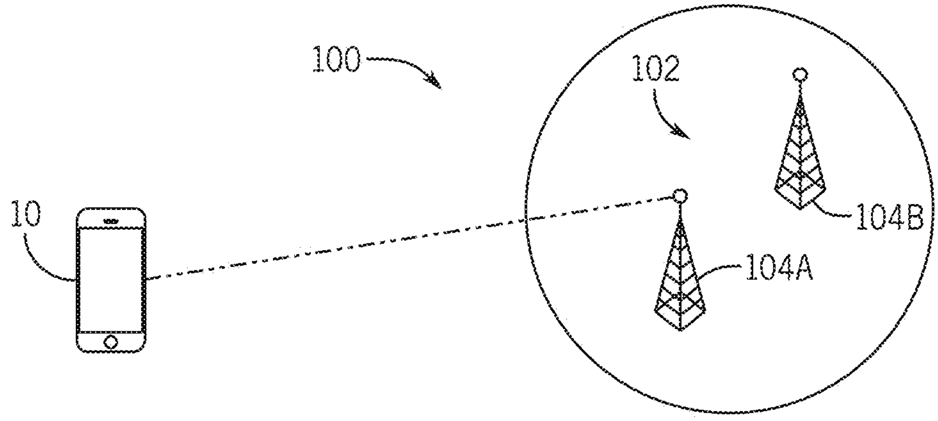
FIG. 5 is a schematic diagram of a communication system including the user equipment of FIG. 1 communicatively coupled to a wireless communication network supported by base stations, according to embodiments of the present disclosure.

FIG. 5 is a schematic diagram of a communication system 100 including the user equipment 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the user equipment 10. The base stations 104 may include any suitable electronic device, such as a communication hub or node, that facilitates, supports, and/or implements the network 102. In some embodiments, the base stations 104 may include Evolved NodeB (eNodeB) base stations and may provide 4G/LTE coverage via the wireless communication network 102 to the user equipment 10. Each of the base stations 104 may include at least some of the components of the user equipment 10 shown in FIGS. 1 and 2, including one or more processors 12, the memory 14, the storage 16, the transceiver 30, the transmitter 52, the receiver 54, and the associated circuitry shown in FIG. 4. It should be understood that while the present disclosure may use 5G/NR as an example specification or standard, the embodiments disclosed herein may apply to other suitable specifications or standards (e.g., such as the 4G/LTE specification). Moreover, the network 102 may include any suitable number of base stations 104 (e.g., one or more base stations 104, four or more base stations 104, ten or more base stations 104, and so on).

Figure 6:
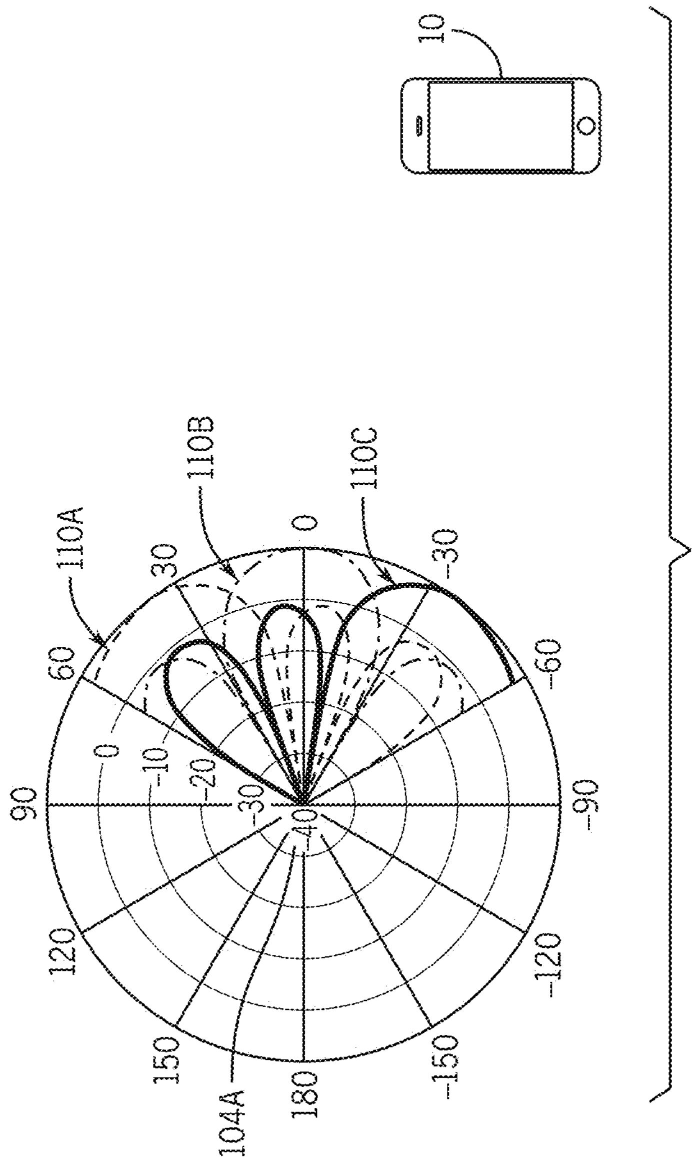
FIG. 6 is a schematic diagram of three beams that may be emitted from a base station of the wireless communication network of FIG. 5, according to embodiments of the present disclosure.

With the foregoing in mind, FIG. 6 is a schematic diagram of three beams that may be emitted from the base station 104A of the wireless communication network 102. In certain embodiments, the techniques described herein may be performed by another base station, such as the base station 104B, or by multiple base stations, such as the base stations 104. The base station 104A may emit beams 110 covering a particular range of angles relative to the base station 104. As illustrated, the base station 104A may emit three beams 110A, 110B, 110C (collectively 110) covering an area of 120 degrees. The beams 110 may be referred to as neighboring beams, as they include consecutive overlapping beams covering a certain range of angles. In particular, each neighboring beam 110 overlaps with at least one other neighboring beam 110, and each neighboring beam 110 covers a different range of angles than another neighboring beams 110. For example, as illustrated, a main lobe (e.g., largest lobe) of each neighboring beam 110 overlaps with at least one other main lobe of one other neighboring beam 110. In certain embodiments, the base station 104A may emit more or fewer beams 110 and/or may cover a different range of angles relative to the base station 104. For example, the base station 104A may emit eight beams 110 covering an area of 360 degrees relative to the base station 104A. The beams 110 may overlap to facilitate providing coverage via the wireless communication network 102 to the user equipment 10. It should be understood that the roles of the base station 104 and the user equipment 10 are used as examples in the present disclosure, and it is contemplated that the roles may be switched. For example, the base station 104A in FIG. 6 may be the user equipment 10, and the user equipment 10 in FIG. 6 may be the base station 104A.

Figure 7:
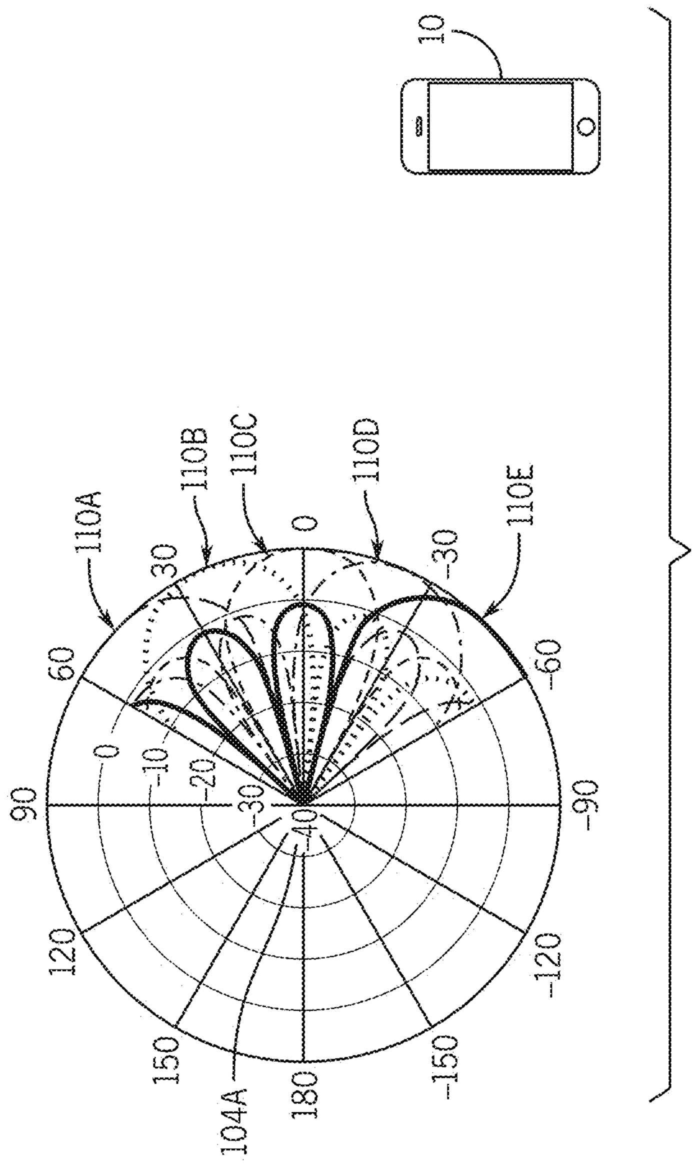
FIG. 7 is a schematic diagram of five beams that may be emitted from a base station of the wireless communication network of FIG. 5, according to embodiments of the present disclosure.

FIG. 7 is a schematic diagram of five beams 110A. 110B, 110C, 110D, 110E (collectively 110) that may be emitted the base station 104A of the wireless communication network 102. The number of the beams 110 (e.g., a density of the beams 110) emitted over a particular range of angles may depend on a geographic location of the base station 104A, a potential number of the user equipment 10 within a particular radius of the base station 104A, a potential mobility of the user equipment 10, a potential location of the user equipment 10, a potential direction of travel of the user equipment 10, and/or other suitable factors. In certain embodiments, the base station 104A may determine the number of the beams 110 emitted over a particular range of angles based on one or more of these factors.

Figure 8:
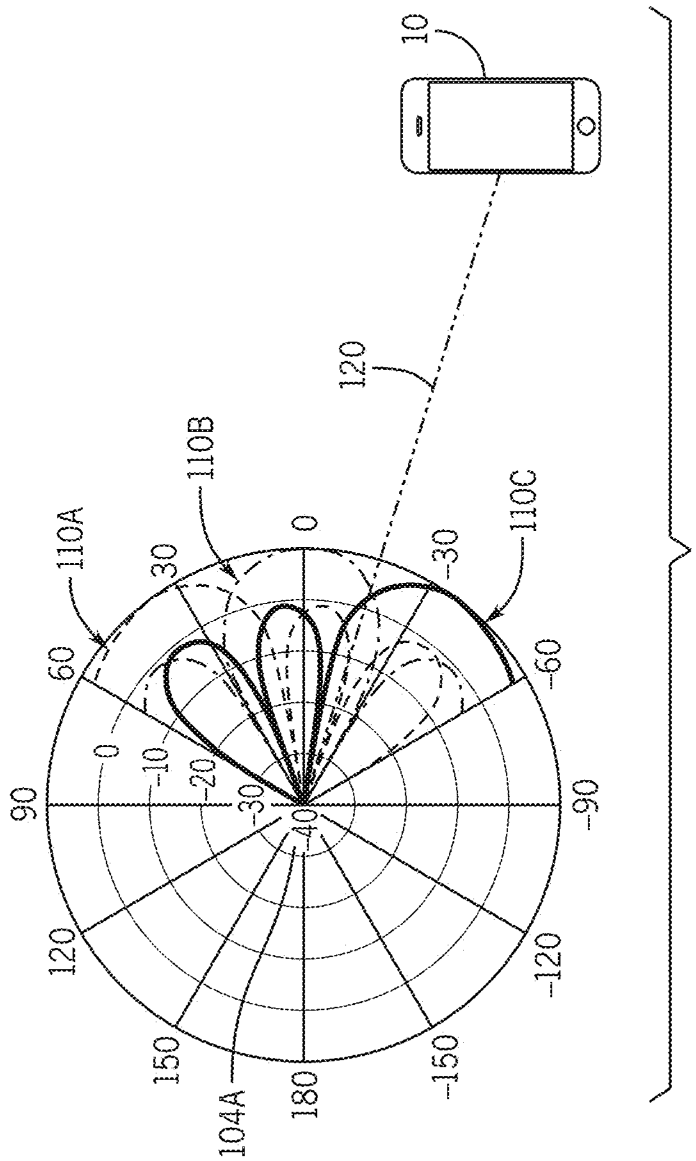
FIG. 8 is a schematic diagram of the three beams of FIG. 6 and a directional indication of a signal from the user equipment of FIG. 1, according to embodiments of the present disclosure.

FIG. 8 is a schematic diagram of the three beams 110 of FIG. 6 and a directional indication of a signal 120 transmitted from the user equipment 10 and received at the base station 104A, such as via a receiver of the base station 104A. The user equipment 10 may receive one or more of the beams 110 transmitted from the base station 104A and transmit the signal 120 to the base station 104A. In certain embodiments, the signal 120 may include data regarding the beams 110, such as a signal characteristic of each beam 110 (e.g., one or more signal characteristics associated with each beam 110), as received at the user equipment 10. The signal characteristic may include a signal strength of each beam 110, a signal power of each beam 110, IQ sample(s) (or in-phase and/or quadrature samples) of each beam 110, and/or other suitable signal characteristics. In radio frequency (RF) applications, a pair of periodic signals may be referred to be in "quadrature" when they differ in phase (e.g., by 90 degrees). The "in-phase" or reference signal is referred to as 'I,' and the signal that is shifted by 90 degrees (the signal in quadrature) is referred to as 'Q.' In certain embodiments, the signal 120 may indicate which beam 110 of the beams 110 has the maximum reference signal received power (RSRP) and/or may indicate the RSRP of each beam 110.

In certain embodiments, the base station 104A (e.g., one or more processors 12 of the base station 104A, processing circuitry of the base station 104A) may determine one or more of the signal characteristics of each beam 110 described above, such as based on an indication of the user equipment received at the base station 104A (e.g., based on the signal 120 received at the base station 104A). For example, the base station 104A may determine a signal strength of each beam 110 based on the indication of the user equipment 10.

Figure 9:
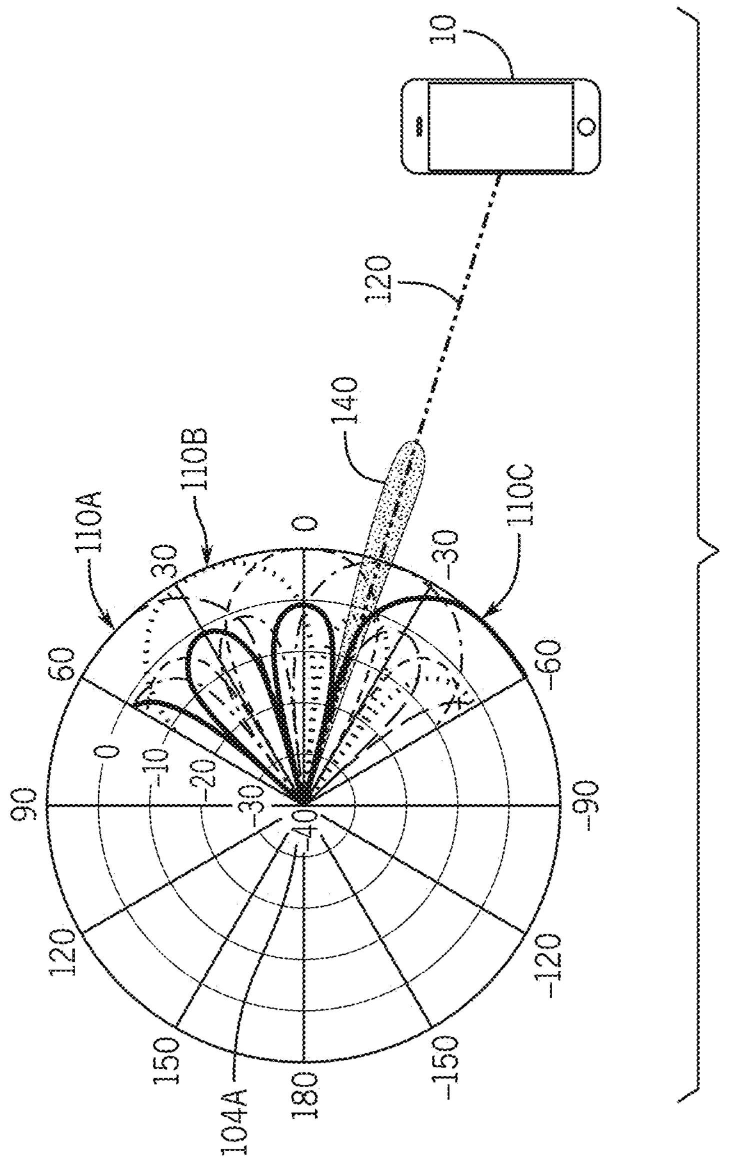
FIG. 9 is a schematic diagram of the three beams and the directional indication of FIG. 8 and a signal range estimate of the signal from the user equipment of FIG. 1, according to embodiments of the present disclosure.

FIG. 9 is a schematic diagram of the three beams 110, the directional indication of the signal 120, and a range estimate 140 of the signal 120. The signal range estimate 140 may be a range of angles covering potential positions of the user equipment 10. The base station 104A may determine the signal range estimate 140 based on the signal characteristic of each beam 110. To do so, the base station 104A may normalize the signal characteristic of each beam 110. In embodiments where the signal characteristic is a signal strength of each beam 110, the base station 104A may normalize the signal strength of each beam 110 relative to the other beams 110. Accordingly, the base station 104A may determine a normalized value of the signal characteristic (e.g., a normalized signal characteristic) of each beam 110. The elevation angle in the schematic diagrams of FIGS. 6-9 may be 0 degrees, though in additional or alternative embodiments, the elevation angle may be any suitable elevation. Additionally, the largest lobes shown in FIGS. 6-9 may include main lobes of the beams.

FIG. 10 is a table 150 of normalized values of the signal characteristics of the beams 110 of FIG. 7 assuming the base station 104A receives the signal 120 shown in FIGS. 8 and 9. In the example where the signal characteristic is the signal strength, the table 150 may indicate that a beam 2 has the greatest signal strength, while a beam 4 has the lowest signal strength.

The base station 104A may compare the normalized value of the signal characteristic of each beam 110 to a predefined data structure (e.g., a table, a diagram, a graph) that correlates the normalized value of the signal characteristic of each beam 110 and potential positions of the user equipment 10. For example, each potential position of the user equipment 10 may correspond to angle (e.g., an angle of departure (AoD)) relative to the base station 104A. An example of the predefined data structure is shown in a table 160 (e.g., a predefined table) of FIG. 11. The table 160 indicates normalized values for the predefined signal characteristics of each of the five beams 110 of FIG. 7 at each angle between −30 degrees and −5 degrees. In certain embodiments, the base station 104A may receive the table 160, such as from the communication system 100 (e.g., from another electronic device of the communication system 100), or may generate the table 160 for each potential position of the user equipment 10. For example, the base station 104A may determine the normalized value of the signal characteristic of each of the five beams 110 for each angle (e.g., each potential position of the user equipment 10) to generate the table 160. Although the table 160 includes only the normalized values for angles between −30 degrees and −5 degrees, the table 160 may include normalized values for greater or fewer ranges of angles, such as between −60 degrees and 60 degrees, as shown in FIG. 7, between −180 degrees and 180 degrees, or other suitable ranges of angles.

The base station 104A may compare the normalized value of the signal characteristic of each beam 110 (e.g., the table 150 of FIG. 10) to the table 160 to determine the angle of the signal 120 relative to the base station 104A. For example, the normalized value of the signal characteristic of each beam 110 corresponds to (e.g., matches) the normalized values of the predefined signal characteristics at the angle of −15 degrees. Accordingly, the base station 104A may determine that the signal 120 is arriving at (e.g., incoming to) the base station 104A at the angle of −15 degrees.

In certain embodiments, noise associated with the signal 120 may affect the determination of the angle of the signal 120. That is, the noise associated with the signal 120 may lower a confidence that the signal 120 is arriving at the base station 104A at the particular angle (e.g., −15 degrees). To increase the confidence associated with the signal, the base station 104A may determine the signal range estimate 140 shown in FIG. 9. To do so, the base station 104A may determine distances (e.g., five-dimensional distances) between the normalized values of the signal characteristics of the beams 110 and the normalized values of the predefined signal characteristics. The base station 104A may determine the signal range estimate 140 as a range of angles having distances between the normalized values of the signal characteristics of the beams 110 and the normalized values of the predefined signal characteristics below a threshold value.

Figure 12:
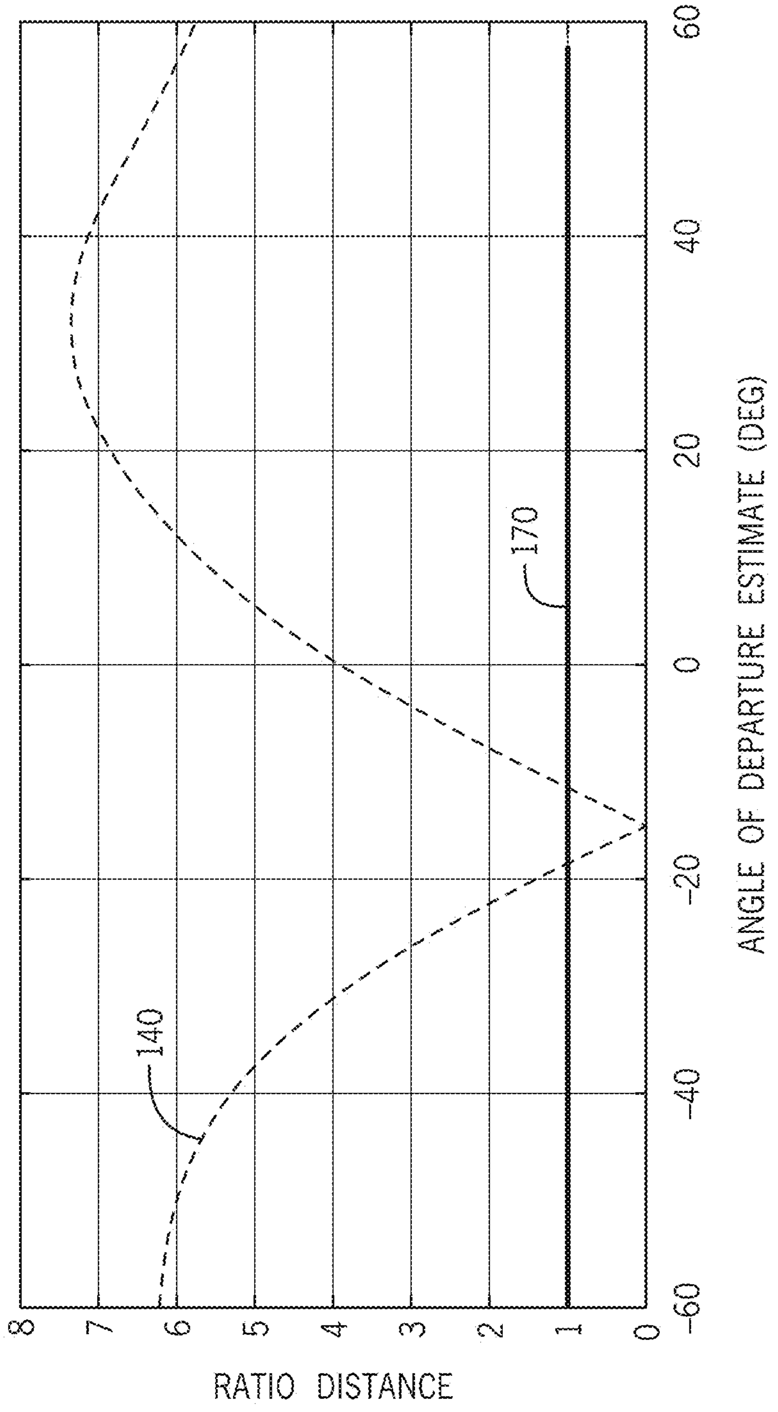
FIG. 12 is a diagram of the signal range estimate of FIG. 9 relative to a ratio of distances between signal characteristics of the five beams of FIG. 7 and the table of FIG. 11, according to embodiments of the present disclosure.

For example, FIG. 12 is a diagram of the signal range or angle of departure estimate 140 of FIG. 9 relative to a ratio of distances between the normalized values of the signal characteristics of the beams 110 and the normalized values of the predefined signal characteristics of the table 160. As illustrated, a threshold value 170 is set as one. In certain embodiments, the threshold value 170 may be set to another value (e.g., 0.5, 2, 2.5, 3), and/or the threshold value 170 may be set by an operator of the base station 104A or of the communication system 100 generally. In certain embodiments, the threshold value 170 may be determined based on a confidence associated with the signal 120, such as an amount of potential noise that may be associated with the signal 120. In the diagram of FIG. 12, the range of angles between −18 degrees and −12 degrees have distances below the threshold value of one. Accordingly, the base station 104A may determine that the signal range or angle of departure estimate 140 is between 18 degrees and −12 degrees.

Figure 13:
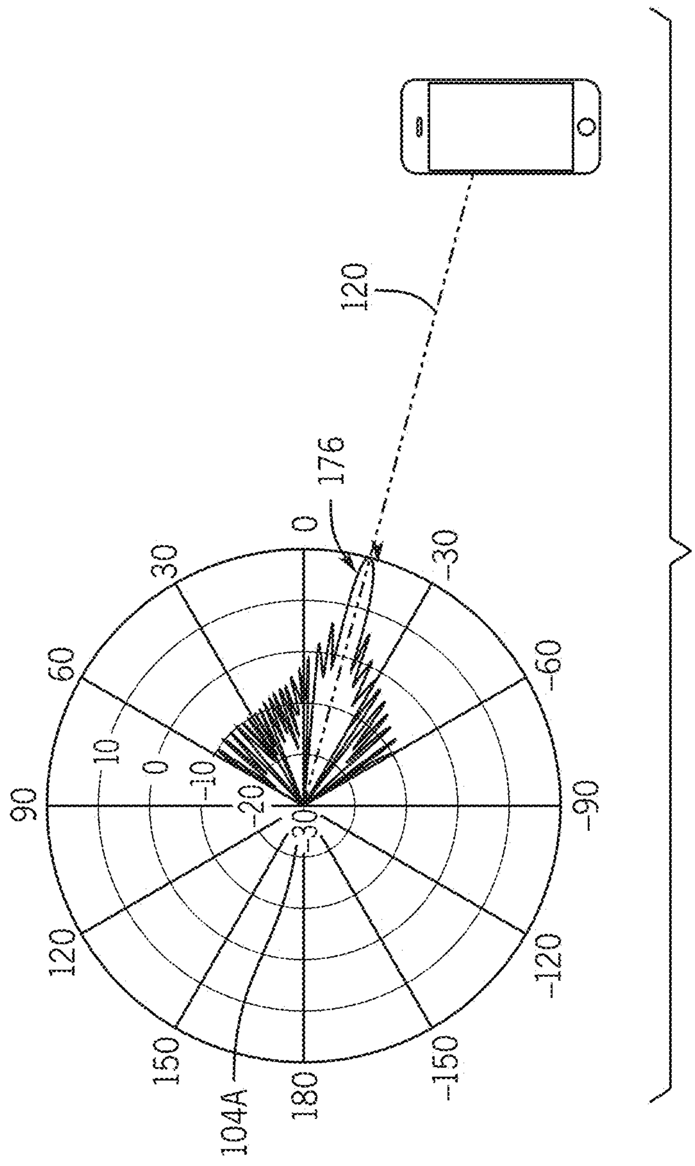
FIG. 13 is a schematic diagram of a targeted beam that may be transmitted to the user equipment of FIG. 1 based on the signal range estimate of FIG. 9, according to embodiments of the present disclosure.

FIG. 13 is a schematic diagram of a targeted beam 176 that may be transmitted by the base station 104A to the user equipment 10. The base station 104A may determine (e.g., generate, form) the targeted beam 176 based on the signal range estimate 140 of FIG. 9. For example, the targeted beam 176 may span the range of angles (e.g., −18 degrees to −12 degrees) of the signal range estimate 140. The targeted beam 176 may facilitate communication between the base station 104A and the user equipment 10, such as via signals transmitted to and/or received by the base station 104A and/or the user equipment 10.

In certain embodiments, the user equipment 10 may determine the signal range estimate 140 and provide the signal range estimate 140 to the base station 104A. For example, the predefined signal characteristics of the beams 110 (e.g., the predefined data structure, the table 160) may be shared with the user equipment 10 via the beams 110 and/or through one or more different communication channels. The user equipment 10 may determine the signal characteristics of the beams 110 (e.g., signal strengths, signal powers, IQ samples) and determine the signal range estimate 140 based on a comparison of the predefined signal characteristics of the beams 110 to the signal characteristics of the beams 110 using the techniques described herein. In certain embodiments, the user equipment 10 may determine which beam 110 has the maximum RSRP and determine the signal range estimate 140 based on the maximum RSRP, the RSRP of the beams 110 neighboring the beam 110 having the maximum RSRP, and the predefined signal characteristics of the beams 110. After determining the signal range estimate 140, the user equipment 10 may provide an indication of the signal range estimate 140 to the base station 104A, and the base station 104A may determine the targeted beam 176 based on the signal range estimate 140.

In certain embodiments, the base station 104A may determine the signal range estimate 140 based on a partial structure of the predefined signal characteristics of the beams 110. For example, the base station 104A may provide consecutive beams 110 indexed monotonically. The user equipment 10 may receive the monotonically indexed beams 110 and provide (e.g., report, transmit) the maximum RSRP of a particular beam 110 and RSRPs of the beams 110 neighboring the particular beam 110 (e.g., RSRPs of three or more beams 110 neighboring the particular beam 110) to the base station 104A. The base station 104A may determine the signal range estimate 140 based on a partial structure of the predefined signal characteristics, such as the signal characteristics for the beams 110 corresponding to the maximum RSRP and the other RSRPs provided by the user equipment 10.

For reception beam acquisition (e.g., reception at the base station 104A and/or the user equipment 10), the neighboring beams 110 may be configured in different time resources, frequency resources, and/or RF chains. In particular, an area of arrival (AoA) may be determined using these factors and/or the techniques described herein. For example, transmission beams may be emitted from a transmission device (e.g., the base station 104A or the user equipment 10), and a reception device (e.g., the base station 104A or the user equipment 10) may determine a signal characteristic of each of the transmission beams, determine a position of the transmission device based on the signal characteristics, and emit a targeted reception beam based on the position of the transmission device.

Figure 14:
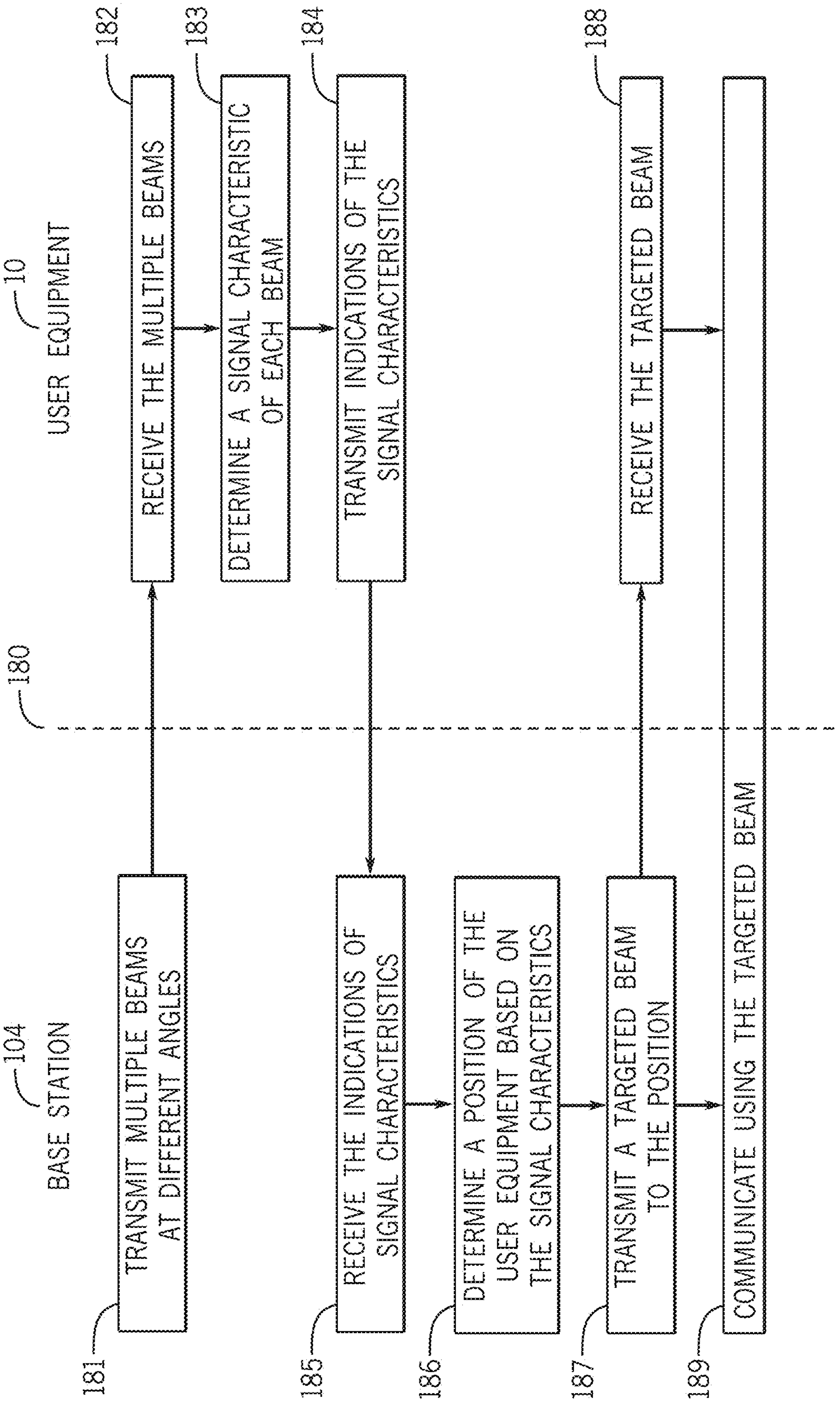
FIG. 14 is a flowchart of a method for beam acquisition, according to embodiments of the present disclosure.

FIG. 14 is a flowchart of a method 180 for beam acquisition, according to embodiments of the present disclosure. Any suitable device (e.g., a controller) that may control components of the base station 104 and/or the user equipment 10, such as the processor 12, may perform the method 180. In some embodiments, the method 180 may be implemented by executing instructions stored in a tangible, non-transitory, computer-readable medium, such as the memory 14 or storage 16, using the processor 12. For example, the method 180 may be performed at least in part by one or more software components, such as an operating system of the base station 104 and/or the user equipment 10, one or more software applications of the base station 104 and/or the user equipment 10, and the like. While the method 180 is described using steps in a specific sequence, it should be understood that the present disclosure contemplates that the described steps may be performed in different sequences than the sequence illustrated, and certain described steps may be skipped or not performed altogether.

In process block 181, the base station 104 transmits multiple beams 110 at different angles, as shown in, for example, FIG. 6. In process block 182, the user equipment 10 receives the multiple beams 110. In process block 183, the user equipment 10 then determines a signal characteristic of each beam. In process block 184, the user equipment 10 transmits indications (e.g., in the form of the signal 120) of the determined signal characteristics to the base station 104. In process block 185, the base station 104 receives the indications, and, in process block 186, the base station 104 determines a position of the user equipment 10 based on the signal characteristics. In process block 187, the base station 104 transmits a targeted beam 176 to the determined position. In process block 188, the user equipment 10 receives the targeted beam 176, and in process block 189, the base station 104 and the user equipment 10 communicate (e.g., exchange data or signals, including user data) using the targeted beam. For example, the base station 104 and the user equipment 10 may exchange user data such as data specific to operations requested or initiated by a user executing software applications on the user equipment 10, such as for transmitting or receiving messages (e.g., electronic mail, Short Message Service (SMS) text message, streaming, gaming, chatting, video conferencing, or the like). In this manner, the method 180 enables the base station 104 to acquire the targeted beam 176.

In cases where the user equipment 10, for example, performs at least some of the process blocks of the method 180 for reception beam acquisition, process blocks 181-183 may be performed, and then the user equipment 10 may determine a position of the base station 104 based on the signal characteristics, and emit a targeted reception beam to the determined position of the base station 104 based on the signal characteristics. The user equipment 10 and the base station 104 may then communicate using the targeted reception beam.

Figure 15:
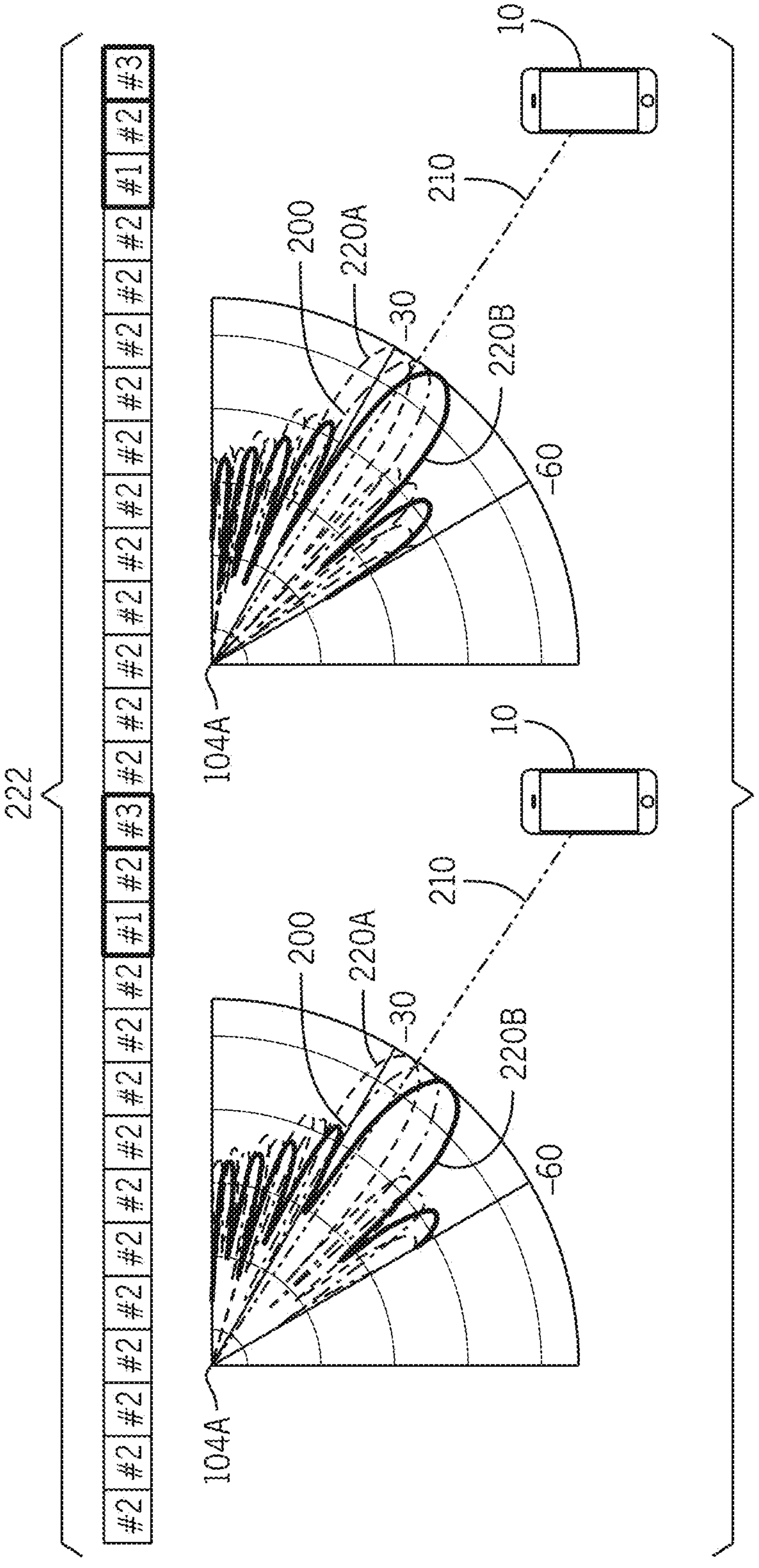
FIG. 15 is a schematic diagram of a targeted beam that may be transmitted to the user equipment of FIG. 1 and an indication of a moving signal from the user equipment of FIG. 1, according to embodiments of the present disclosure.

FIG. 15 is a schematic diagram of a targeted beam 200 that may be transmitted to the user equipment 10 from the base station 104A and an indication of a signal 210 transmitted from the user equipment 10 to the base station 104A. The targeted beam 200 may be formed and provided by the base station 104A using one or more of the techniques described herein, such that the signal 210 may initially be aligned with the signal 210. Additionally, the base station 104A may provide neighboring beams 220A. 220B (collectively 220) (e.g., beams neighboring the targeted beam 200).

The neighboring beams 220 may enable the base station 104A to determine movement of the user equipment 10 (e.g., an updated position of the user equipment 10) relative to the base station 104A. The user equipment 10 may receive the targeted beam 200 and the neighboring beams 220 and transmit the signal 210 to the base station 104A. In certain embodiments, the signal 210 may indicate signal characteristics of the targeted beam 200 and the neighboring beams 220. In certain embodiments, the base station 104A may determine the signal characteristics (e.g., updated signal characteristics) of the targeted beam 200 and the neighboring beams 220 based on the indication of the user equipment 10 (e.g., the signal 210 received from the user equipment 10), such as a signal strength associated with each of the targeted beam 200 and the neighboring beams 220. The base station 104A may determine whether the signal characteristics are different than previous signal characteristics of the targeted beam 200 and/or the neighboring beams 220, such as signal characteristics previously determined to form the targeted beam, and may determine that the position of the user equipment 10 relative to the base station 104A has changed based on the previous signal characteristics of the targeted beam 200 and/or the neighboring beams 220 being different than the newer signal characteristics of the targeted beam 200 and/or the neighboring beams 220. In some embodiments, the base station 104A may determine that the signal characteristics are different when the signal characteristics exceed a threshold difference when compared to the previous signal characteristics. In response to determining the difference, the base station 104A may form an updated targeted beam based on the newer signal characteristics of the targeted beam 200 and/or the neighboring beams 220. For example, the base station 104A may steer the targeted beam 200 toward the updated position of the user equipment 10, such that the targeted beam 200 once again aligns with the updated position of the user equipment 10 and the signal 210 transmitted from the user equipment 10.

The base station 104A may determine whether the position of the user equipment 10 relative to the base station 104A has changed periodically, as indicated by a time sequence 222 in FIG. 15, aperiodically, and/or on-demand (e.g., as requested by the user equipment 10). In certain embodiments, the base station 104A may determine a periodicity for determining whether the position of the user equipment 10 has changed based on a mobility of the user equipment 10, a position of the user equipment 10, a direction of travel of the user equipment 10, and/or other suitable factors.

In certain embodiments, the base station 104A may only transmit the neighboring beams 220 during periods in which the base station 104A is determining a potential new position of the user equipment 10. For example, the time sequence 222 indicates that the base station 104A transmits the targeted beam 200 (e.g., beam #2) for nine units of time and then transmits the targeted beam 200 and the neighboring beams 220 (e.g., beam #1 and beam #3) for three units of time (e.g., each beam being transmitted for a unit of time). During and/or after transmitting the targeted beam 200 and the neighboring beams 220, the base station 104A may determine the updated signal characteristics of the targeted beam 200 and the neighboring beams 220 and whether the position of the user equipment 10 has changed relative to the base station 104A. The base station 104A may adjust (e.g., steer) the targeted beam 200 based on the updated position of the user equipment 10, emit the targeted beam 200 for nine units of time, emit the targeted beam 200 and the neighboring beams 220, and continue to repeat the process for tracking the position of the user equipment 10 and adjusting the targeted beam 200 to facilitate communication with the user equipment 10 as the user equipment 10 moves. In certain embodiments, the base station 104A may determine a size of the targeted beam 200 and the neighboring beams 220 and spacings between the targeted beam 200 and the neighboring beams 220 based on a mobility of the user equipment 10, a position of the user equipment 10, a direction of travel of the user equipment 10, and/or other suitable factors.

In certain embodiments, the base station 104A may track the position of the user equipment 10 using different CSI-RS ports. For example, the neighboring beams 220 may provide CSI signals, and the user equipment 10 may report CSI-RSRPs of the neighboring beams 220 to the base station 104A. The base station 104A may determine the signal range estimate based on the reported CSI-RSRPs using the techniques described herein. In certain embodiments, the user equipment 10 may report a phase of an observed RS channel for a relatively high number of neighboring beams 220 and/or a relatively large spacing between the neighboring beams 220. In certain embodiments, the user equipment 10 may determine the signal range estimate based on the CSI-RSRPs and report the determined signal range estimate to the base station 104A.

In certain embodiments, a modulation coding scheme (MCS) of data transmitted while tracking the position of the user equipment 10 may be adjusted based on feedback from the user equipment 10, and a different channel quality indicator (CQI) may be used for the neighboring beams 220. For example, the user equipment 10 may provide feedback indicating the CQI of the targeted beam 200, and the base station 104A may adjust the CQI of the neighboring beams 220 to be lower (e.g., one number lower, one step lower) than the CQI of the targeted beam 200.

In certain embodiments, the user equipment 10 may report the received signal strength indicator (RSSI) of the targeted beam 200 and the neighboring beams 220, and the base station 104A may use the reported RSSIs to determine the signal range estimate. In certain embodiments, the user equipment 10 may determine the signal range estimate based on the RSSIs and report the determined signal range estimate to the base station 104A.

For reception beam tracking, the user equipment 10 may sweep neighboring reception beams on different time resources and/or frequency resources and determine signal characteristics of the neighboring reception beams. The user equipment 10 may determine an AoA estimation based on the signal characteristics and align a reception beam based on the signal characteristics of the neighboring reception beams using the techniques described herein. In certain embodiments, the user equipment 10 may use multiple RF chains to form the neighboring reception beam set and determine the signal characteristics of the neighboring reception beams simultaneously to determine the AoA estimation and align the reception beam. Accordingly, the targeted beam 200 and the neighboring beams 220 may be emitted from the base station 104A, and the user equipment 10 may determine a signal characteristic of each beam, determine an updated position of the user equipment relative to the base station 104A based on the signal characteristics, and emit a targeted reception beam (e.g., an updated targeted reception beam) based on the updated position of the user equipment 10.

Figure 16:
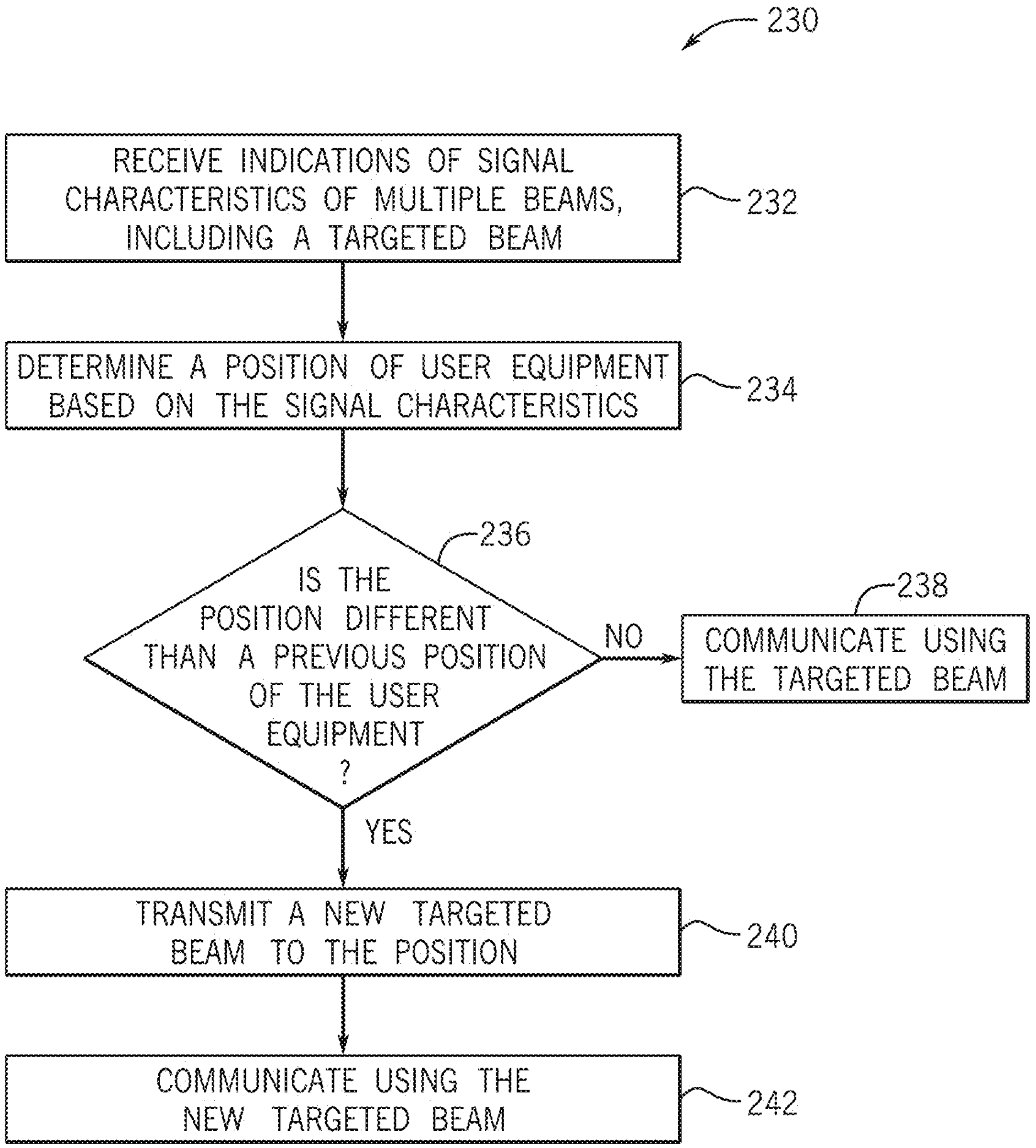
FIG. 16 is a flowchart of a method for beam tracking, according to embodiments of the present disclosure.

FIG. 16 is a flowchart of a method 230 for beam tracking, according to embodiments of the present disclosure. Any suitable device (e.g., a controller) that may control components of the base station 104 and/or the user equipment 10, such as the processor 12, may perform the method 230. In some embodiments, the method 230 may be implemented by executing instructions stored in a tangible, non-transitory, computer-readable medium, such as the memory 14 or storage 16, using the processor 12. For example, the method 230 may be performed at least in part by one or more software components, such as an operating system of the base station 104 and/or the user equipment 10, one or more software applications of the base station 104 and/or the user equipment 10, and the like. While the method 230 is described using steps in a specific sequence, it should be understood that the present disclosure contemplates that the described steps may be performed in different sequences than the sequence illustrated, and certain described steps may be skipped or not performed altogether.

The method 230 may be performed after a targeted beam (e.g., 176, 200) has been acquired, such as described in the method 180 of FIG. 14. In process block 232, the base station 104 receives indications (e.g., in the form of the signal 120 or the signal 210) of signal characteristics of multiple beams, including the target beam 200. In process block 234, the base station 104 determines a position of the user equipment 10 based on the signal characteristics. In decision block 236, the base station 104 determines whether the position is different from a previously determined position of the user equipment 10. In some embodiments, the base station 104 may determine that the position is different if it exceeds a threshold distance (e.g., 1 meter (m) or more, 10 m or more, 50 m or more, 100 m or more 200 m or more, and so on) from the previously determined position. The previously determined position may be determined, for example, in process block 186 of the method 180 of FIG. 14. If the base station 104 determines that the position is not different (e.g., does not exceed a threshold distance) from the previously determined position of the user equipment 10, then, in process block 238, the base station 104 communicates (e.g., exchanges data or signals, including user data) with the user equipment 10 using the targeted beam 200. If the base station 104 determines that the position is different (e.g., does exceed a threshold distance) from the previously determined position of the user equipment 10, then the base station 104 may determine that the user equipment 10 has moved from the previous position, and, in process block 238, the base station 104 generates and transmits a new targeted beam (e.g., the adjusted beam 200 of FIG. 15) to the newly determined position of the user equipment 10. In process block 242, the base station 104 then communicates with the user equipment 10 using the new or adjusted targeted beam 200. In this manner, the method 230 enables the base station 104 to track the user equipment 10. Moreover, the user equipment 10 may perform at least some process blocks.

In cases where the user equipment 10, for example, performs at least some of the process blocks of the method 230 for reception beam tracking, the user equipment 10 may determine signal characteristics of the multiple beams transmitted by the base station 104, then perform process blocks 234-242, in which the user equipment 10 transmits a new targeted reception beam in process block 240. The user equipment 10 and the base station 104 may then communicate using the targeted reception beam per process block 242.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
- a plurality of antennas;
- a transmitter coupled to the plurality of antennas, the transmitter configured to transmit a plurality of beams from the plurality of antennas; and
- processing circuitry coupled to the transmitter, the processing circuitry configured to
  - receive a signal characteristic of each beam of the plurality of beams,
  - receive a signal range estimate based on the signal characteristic of each beam of the plurality of beams, and
  - transmit, using the transmitter, a targeted beam based on the signal range estimate.

2. The electronic device of claim 1, wherein the processing circuitry is configured to transmit, using the transmitter, data to a user equipment using the targeted beam.

3. The electronic device of claim 1, wherein the processing circuitry is configured to receive the signal range estimate based on the signal characteristic of each beam of the plurality of beams and a predefined table.

4. The electronic device of claim 3, wherein the predefined table correlates the signal characteristic of each beam of the plurality of beams and a plurality of angles of departure relative to the electronic device.

5. The electronic device of claim 4, wherein the signal range estimate comprises a range of angles of departure from the plurality of angles of departure relative to the electronic device.

6. The electronic device of claim 5, wherein the targeted beam spans the range of angles of departure.

7. The electronic device of claim 5, wherein the processing circuitry is configured to receive the signal range estimate based on the signal characteristic of each beam of the plurality of beams and the predefined table by
- determining a normalized signal characteristic of each beam based on the signal characteristic of each beam,
- determining a distance between the normalized signal characteristic of each beam and a predefined characteristic associated with each angle of departure of the plurality of angles of departure relative to the electronic device, and
- determining the range of angles of departure based on the distance between the normalized signal characteristic of each beam and the predefined characteristic associated with each angle of departure being below a threshold value.

8. The electronic device of claim 1, wherein the processing circuitry is configured to
- receive an indication of signal power associated with each beam of a portion of the plurality of beams,

- receive a maximum signal power of a beam of the portion of the plurality of beams and one or more additional signal powers of one or more additional beams of the portion of the plurality of beams based on the indication, and
- receive the signal range estimate based on the maximum signal power of the beam and the one or more additional signal powers of the one or more additional beams.

9. An electronic device, comprising:
- a receiver configured to receive a plurality of beams;
- a transmitter; and
- processing circuitry coupled to the transmitter and the receiver, the processing circuitry configured to
  - receive a signal characteristic of each beam of the plurality of beams,
  - receive a signal range estimate based on the signal characteristic of each beam of the plurality of beams, and
  - transmit, using the transmitter, an indication of the signal range estimate to an additional electronic device.

10. The electronic device of claim 9, wherein the receiver is configured to receive a targeted beam from the additional electronic device, the targeted beam being determined based on the signal range estimate, and wherein the signal range estimate comprises a range of angles of departure relative to the additional electronic device.

11. The electronic device of claim 9, comprising a memory storing a data structure associating a plurality of predefined signal characteristics of each beam of the plurality of beams and a plurality of potential positions of the electronic device.

12. The electronic device of claim 11, wherein the additional electronic device comprises a base station or access point, and wherein the processing circuitry is configured to receive an indication of the data structure from the base station or access point.

13. The electronic device of claim 9, wherein the signal characteristic of each beam of the plurality of beams comprises a signal strength of each beam of the plurality of beams.

14. The electronic device of claim 9, wherein the processing circuitry is configured to emit, using the receiver, a targeted reception beam based on the signal range estimate.

15. The electronic device of claim 9, wherein the processing circuitry is configured to
- receive a maximum signal power of a beam of the plurality of beams and one or more additional signal powers of one or more additional beams of the plurality of beams based on the indication, and
- receive the signal range estimate based on the maximum signal power of the beam and the one or more additional signal powers of the one or more additional beams.

16. A method, comprising:
- transmitting, using a transmitter of an electronic device, a plurality of beams from a plurality of antennas of the electronic device;
- receiving, at processing circuitry of the electronic device, a signal characteristic of each beam of the plurality of beams;
- receiving, at the processing circuitry, a signal range estimate based on the signal characteristic of each beam of the plurality of beams and a predefined table; and
- transmitting, using the transmitter, a targeted beam based on the signal range estimate.

17. The method of claim 16, comprising transmitting, using the transmitter, one or more signals to an additional electronic device using the targeted beam.

18. The method of claim 16, comprising:

receiving, at the processing circuitry, an additional signal characteristic of each beam of the plurality of beams;

determining, at the processing circuitry, that the additional signal characteristic of each beam is different than the signal characteristic of each beam;

determining an updated signal range estimate based on the additional signal characteristic of each beam being different than the signal characteristic of each beam; and transmitting, using the transmitter, an updated targeted beam based on the updated signal range estimate.

19. The method of claim 18, wherein determining, at the processing circuitry, that the additional signal characteristic of each beam is different than the signal characteristic of each beam comprises determining, at the processing circuitry, that the additional signal characteristic of each beam is different by a threshold difference from the signal characteristic.

20. The method of claim 16, comprising:

receiving, at the processing circuitry, an indication of signal power associated with each beam of a portion of the plurality of beams;

determining, at the processing circuitry, a maximum signal power of a beam of the portion of the plurality of beams and one or more additional signal powers of one or more additional beams of the portion of the plurality of beams based on the indication; and receiving, at the processing circuitry, the signal range estimate based on the maximum signal power of the beam and the one or more additional signal powers of the one or more additional beams.

* * * * *